(12) United States Patent  (10) Patent No.: US 8,111,936 B2
Batkilin et al.  (45) Date of Patent: Feb. 7, 2012

(54) METHOD AND DEVICE FOR PROCESSING OF IMAGES USING A DIGITAL FILTER

(75) Inventors: Eduard Batkilin, Nesher (IL); Alex Feldman, Nofit (IL); Irina Karelin, Haifa (IL)

(73) Assignee: Generic Imaging Ltd, Nesher (IL)

( * ) Notice: Subject to any disclaimer, the term of this patent is extended or adjusted under 35 U.S.C. 154(b) by 521 days.

(21) Appl. No.: 12/393,606

(22) Filed: Feb. 26, 2009

(65) Prior Publication Data

US 2009/0220147 A1  Sep. 3, 2009

Related U.S. Application Data

(60) Provisional application No. 61/067,348, filed on Feb. 28, 2008.

(51) Int. Cl.
*G06K 9/40* (2006.01)

(52) U.S. Cl. .................................................. 382/254
(58) Field of Classification Search ........... 382/254–275
See application file for complete search history.

(56) References Cited

U.S. PATENT DOCUMENTS 7,801,386 B2 * 9/2010 Maurer ........................ 382/254

* cited by examiner

*Primary Examiner* — Alex Liew
(74) *Attorney, Agent, or Firm* — Pearl Cohen Zedek Latzer, LLP

(57) ABSTRACT

A system, device and a method to perform bilateral filtering using linear convolution by way of an FFT or a recursive sequence method. Proper selection of functions for the photometric and spatial components of a bilateral filter may reduce the computational cost of the bilateral filter while preserving the bilateral filter de-noising and edge detection capabilities. Such functions may reduce the computational cost of a bilateral filter to substantially O(1).

25 Claims, 3 Drawing Sheets

METHOD AND DEVICE FOR PROCESSING OF IMAGES USING A DIGITAL FILTER

CROSS-REFERENCE TO RELATED APPLICATION

This application claims priority from U.S. Provisional Application No. 61/067,348, filed on Feb. 28, 2008 and entitled "Method and Device for Improvement of Color Images Using Digital Filter", the entire disclosure of which is incorporated herein by reference.

FIELD OF THE INVENTION

The present invention relates to the field of image processing. More specifically, the invention relates to bilateral filtering which may be used for improving image contrast and dynamic range, for de-noising and for image segmentation.

BACKGROUND OF THE INVENTION

A bilateral filter is a nonlinear filter that may smooth an image while preserving strong edges. The bilateral filter considers both spatial and photometric differences between a pixel under consideration $Y(\vec{r})$ where $\vec{r}=(x_1,\ldots,x_m)$ ($m \geq 1$) and its neighbors $Y(\vec{r}')$ to produce a surrounding function $w(\vec{r},\vec{r}')$. The surrounding function is than convoluted with image $Y(\vec{r})$ to yield the output image:

$$X(\vec{r}) = \frac{1}{v(\vec{r})} \sum_{\vec{r}'} w(\vec{r}, \vec{r}') \cdot Y(\vec{r}') \quad \text{(Equation 1)}$$

$$v(\vec{r}) = \sum_{\vec{r}'} w(\vec{r}, \vec{r}')$$

The function $w(\vec{r},\vec{r}')$ is dependent on both a photometric value of the pixel $Y(\vec{r})$ and pixel position $\vec{r}$, so that $$w(\vec{r},\vec{r}') = w_s(\vec{r}-\vec{r}') \cdot w_{ph}(Y(\vec{r})-Y(\vec{r}')) \quad \text{(Equation 2)}$$

where $w_s$ is a spatial component and $w_{ph}$ is a photometric component.

Typically, Gaussian functions are used for both the spatial and the photometric component:

$$w_s(\vec{r}) = \exp\left(-\frac{|\vec{r}-\vec{r}'|^2}{\sigma_s^2}\right) \quad \text{(Equation 3)}$$

and for the photometric component:

$$w_{ph}(\vec{r},\vec{r}') = \exp\left(-\frac{(Y(\vec{r})-Y(\vec{r}'))^2}{\sigma_{ph}^2}\right) \quad \text{(Equation 4)}$$

while $\sigma_s$ and $\sigma_{ph}$ are constants.

Convolution with spatial component can be calculated efficiently by way of Fast Fourier Transform (FFT). However, calculations of Equation 1 with a photometric component $w_{ph}(Y(\vec{r}),Y(\vec{r}'))$ may not be preformed by FFT and may involve a large computational cost. The computational cost of the above described bilateral filter may be estimated to be $O(N)$ operations per pixel where N is the number of pixels in support. One method to decrease the computational cost is by approximate filter calculation. Alternatively, bilateral filtering may be calculated by an iterative method.

SUMMARY OF THE INVENTION

The present invention proposes a system, device and method for performing bilateral filtering using convolution by way of FFT or a recursive sequence method. According to some embodiments of the invention, a bilateral filtering system may comprise an imaging device to take at least one input image, said input image is in the form of digital data indexed to represent the intensity $Y(\vec{r})$ at a particular position $\vec{r}=(x_1,\ldots,x_m)$ ($m \geq 1$) in said image, a processor to calculate a corresponding second image $X(\vec{r})$ using a bilateral filter of the form:

$$X(\vec{r}) = \frac{1}{v(\vec{r})} \sum_{\vec{r}'} w(\vec{r}, \vec{r}') \cdot Y(\vec{r}') \quad \text{(Equation 1)}$$

$$v(\vec{r}) = \sum_{\vec{r}'} w(\vec{r}, \vec{r}')$$

where $w(\vec{r},\vec{r}')=w_s(\vec{r}-\vec{r}') \cdot w_{ph}(Y(\vec{r})-Y(\vec{r}'))$ (Equation 2)

$w_s$ is a spatial component, $w_{ph}$ is a photometric component, and at least one of said components is in the form:

$$w(t) = w_0 + \sum_{k=1}^{n} s_k \cdot w_k(t) \quad \text{(Equation 5)}$$

$$w_k(t) = a_k^t \quad \text{(Equation 6)}$$

where $a_k$ ($k=1\ldots n$), $w_0$ and $s_k$ ($k=1\ldots n$) are constants and t belongs to a window interval $I=[-N_1,N_2]$, and a display unit to present said second image $X(\vec{r})$.

According to some embodiments of the invention, a method for bilateral filtering may comprise taking at least one input image, said input image is in the form of digital data indexed to represent the intensity $Y(\vec{r})$ at a particular position $\vec{r}=(x_1,\ldots,x_m)$ ($m \geq 1$) in said image, calculating a corresponding second image $X(\vec{r})$ using a bilateral filter of the form:

$$X(\vec{r}) = \frac{1}{v(\vec{r})} \sum_{\vec{r}'} w(\vec{r}, \vec{r}') \cdot Y(\vec{r}') \quad \text{(Equation 1)}$$

$$v(\vec{r}) = \sum_{\vec{r}'} w(\vec{r}, \vec{r}')$$

where, (Equation 2)

$$w(\vec{r},\vec{r}') = w_s(\vec{r}-\vec{r}') \cdot w_{ph}(Y(\vec{r})-Y(\vec{r}'))$$

$w_s$ is a spatial component, $w_{ph}$ is a photometric component, and at least one of said components is in the form:

$$w(t) = w_0 + \sum_{k=1}^{n} s_k \cdot w_k(t) \quad \text{(Equation 5)}$$

$$w_k(t) = a_k^t \quad \text{(Equation 6)}$$

where $a_k$ (k=1 ... n), $w_0$ and $s_k$ (k=1 ... n) are constants and t belongs to a window interval $I=[-N_1,N_2]$ and displaying said second image $X(\vec{r})$.

According to some embodiments of the invention, at least one of said components take the form:

$$w(t)=f_n(t)=(1+\cos \sigma t)^n \quad \text{(Equation 8)}$$

Or the form $$w(t)=w_0-\cos h(t/\sigma) \quad \text{(Equation 11)}$$

where n is a natural number and σ may be a real number.

According to some embodiments of the invention, said corresponding second image $X(\vec{r})$ is calculated according to $$X(\vec{r}) = \frac{1}{v(\vec{r})} e^{-\sigma \cdot Y(\vec{r})} \cdot \sum_{\vec{r}'} e^{\sigma \cdot Y(\vec{r}')} \cdot Y(\vec{r}') \cdot w_s(\vec{r} - \vec{r}') \quad \text{(Equation 16)}$$

where $w_s$ is a kernel of a spatial filter, σ is a real constant and $$v(\vec{r}) = \sum_{\vec{r}'} e^{\sigma \cdot (Y(\vec{r}) - Y(\vec{r}'))} \cdot w_s(\vec{r} - \vec{r}') \quad \text{(Equation 15)}$$

According to some embodiments of the invention, at least one of said photometric and spatial components is in the form:

$$w(t_1, t_2, \ldots, t_k) = w_1(t_1) \cdot w_2(t_2) \cdot \ldots \cdot w_k(t_k) \quad \text{(Equation 5)}$$

where each sub-component $w_1(t_1), w_2(t_2) \ldots w_k(t_k)$ conforms to said Equations 5 and 6.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
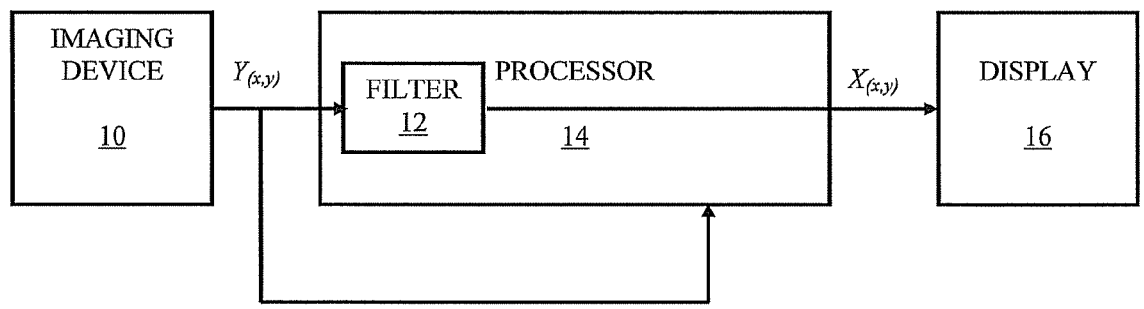
FIG. 1 is a block diagram of an exemplary bilateral filtering system according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to some embodiments of the present invention proper selection of functions for the photometric and spatial components of a bilateral filter may reduce the computational cost of the bilateral filter while preserving the bilateral filter de-noising and edge detection capabilities. Such functions may reduce the computational cost of a bilateral filter to substantially O(1). For clarity proposes, embodiments of the invention will mostly be described as it relates to a gray level two-dimensional digital images. However, as it will be explained further in this document, the present method can be extended to color images and images of higher dimensions.

Reference is now made to FIG. 1 which is a block diagram of an exemplary bilateral filtering system 100 according to some embodiments of the invention. System 100 may comprise a digital imaging device 10, a display device 16, a processor 12 and a filter 14. Digital imaging device 16 may be a digital camera, capable of outputting image data in the form of digital data indexed to represent the intensity Y at a particular position in the image to be displayed on display device 16. Display device 16 may be a generic screen-type display device, a printing device, a projector etc. The position of a pixel can also be represented by a vector $\vec{r}$ while $\vec{r}=(x_1, \ldots, x_m)$ ($m \geq 1$). In a planar two dimensional image each position $\vec{r}=(x,y)$ may refer, in a planar two dimensional array, to a single row/column pixel position of display device 16. The display area of display device 16 may be an M-row by N-column array. The intensity of each pixel in an input image receivable from imaging device 10 may be processed, adjusted and filtered in accordance with the present method by processor 14 accommodating filter 12.

Figure 2:
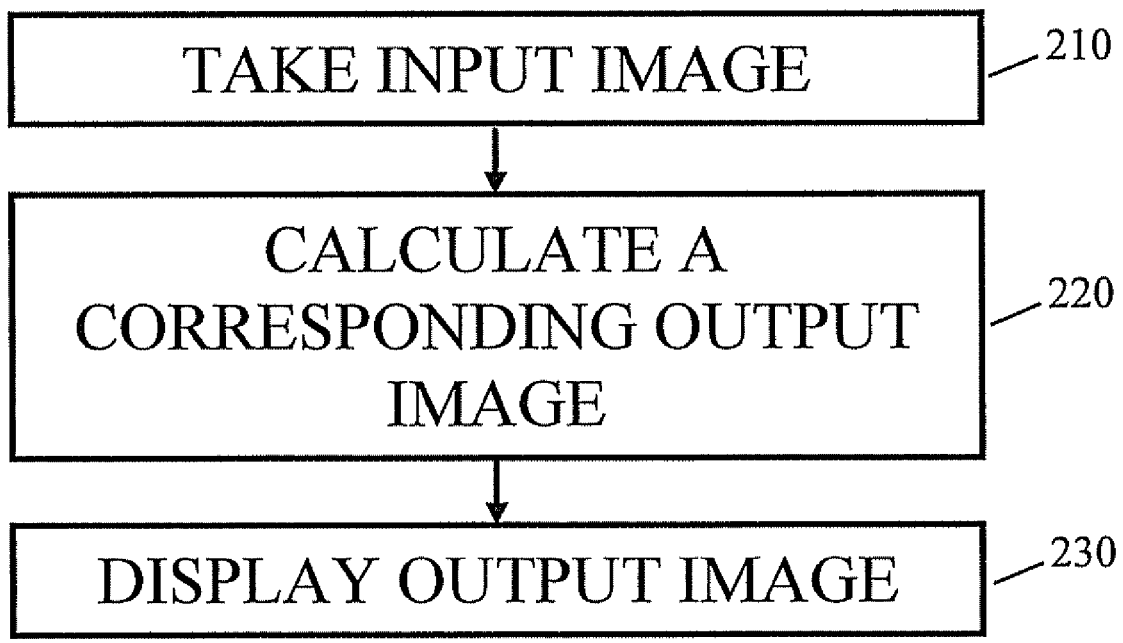
FIG. 2 is an exemplary flowchart of a method of improving an image according to some embodiments of the invention.

Reference is now made to FIG. 2 which is a schematic flowchart illustration of a method which may be performed by a system performing a bilateral filter according to some demonstrative embodiments of the invention. Although embodiments of the invention are not limited in this respect, the method may be performed by embodiments of the invention, for example, an embodiment as shown in FIG. 1.

According to some embodiments of the invention a bilateral filter may be performed with a photometric component, a spatial component or both of the general form:

$$w(t) = w_0 + \sum_{k=1}^{n} s_k \cdot w_k(t) \quad \text{(Equation 6)}$$

where $$w_k(t) = a_k^t \quad \text{(Equation 7)}$$

$a_k$ (k=1 ... n), $w_0$ and $s_k$ (k=1 ... n) are constants, t belongs to an interval $I=[T_1,T_2]$.

It can be mathematically proved that each of $w_k$ has a property:

$$w_k(t_1+t_2) = w_k(t_1) \cdot w_k(t_2) \quad \text{(Equation 8)}$$

Using mathematical expressions that conform to Equations 5 and 6 as the photometric component, spatial component or both, of a bilateral filter may simplify the convolution defined in Equation 1, as will be demonstrated in the following examples.

For example, the photometric component may take the form:

$$w(t)=f_n(t)=(1+\cos \sigma t)^n \quad \text{(Equation 9)}$$

where n is a natural number and σ may be a real number. $f_n(t)$ may be expanded into Fourier polynomial:

$$f_n(t) = \frac{a_0}{2} + \sum_{k=1}^{n} a_k \cos k \cdot \sigma \cdot t \quad \text{(Equation 10)}$$

where each of components cos kσt may be written as $$g_k(t) = \cos k \cdot \sigma \cdot t = \frac{1}{2}(e^{ik\sigma t} + e^{-ik\sigma t}) \quad \text{(Equation 11)}$$

thus, Equation 8 is in the form of Equations 5 and 6. Another example for a function of Equations 5 and 6 may be the hyperbolic cosine:

$$w(t) = w_0 - \cosh(t/\sigma) = w_0 - \frac{e^{t/\sigma} + e^{-t/\sigma}}{2} \quad \text{(Equation 12)}$$

According to some embodiments of the invention, when filters of the forms presented in Equations 8 and 11 are used for photometric filtering the argument of the filter function may be the intensity value in a pixel, such that:

$$w_{ph}(\vec{r}, \vec{r}') = \hat{w}(Y(\vec{r}), Y(\vec{r}')) \quad \text{(Equation 13)}$$

where $Y(\vec{r})$ are the intensity values of the image in a point $\vec{r}=(x,y)$ and $Y(\vec{r}')$ is intensity values of the image in surrounding pixels $\vec{r}'$ pertaining to a window around $\vec{r}$. Moreover, according to some embodiments of the invention, an unbiased photometric filter may be used, i.e. a filter which depends only on the difference $Y(\vec{r})-Y(\vec{r}')$:

$$w_{ph}(\vec{r}, \vec{r}') = w(Y(\vec{r}')-Y(\vec{r})) \quad \text{(Equation 14)}$$

Filtering with the function of the forms presented in Equation 8 and Equation 11 when the argument is the difference $Y(\vec{r})-Y(\vec{r}')$ and when σ may be a real or imaginary number may be a linear combination of expressions of the type:

$$X(\vec{r}) = \frac{1}{v(\vec{r})} \sum_{\vec{r}'} e^{\sigma \cdot (Y(\vec{r})-Y(\vec{r}'))} \cdot Y(\vec{r}') \cdot w_s(\vec{r}-\vec{r}') \quad \text{(Equation 15)}$$

where $$v(\vec{r}) = \sum_{\vec{r}'} e^{\sigma \cdot (Y(\vec{r})-Y(\vec{r}'))} \cdot w_s(\vec{r}-\vec{r}') \quad \text{(Equation 16)}$$

Equation 14 may be modified to the expression:

$$X(\vec{r}) = \frac{1}{v(\vec{r})} e^{-\sigma \cdot Y(\vec{r})} \cdot \sum_{\vec{r}'} e^{\sigma \cdot Y(\vec{r}')} \cdot Y(\vec{r}') \cdot w_s(\vec{r}-\vec{r}'). \quad \text{(Equation 17)}$$

where $w_s$ is the kernel of a spatial filter. The sum in Equation 16 is a convolution which can be efficiently calculated using FFT. Moreover if the spatial filter $w_s$ is a separable filter, i.e. $w_s(x,y)=w_x(x) \cdot w_y(y)$ defined in the interval $I=[X_1,X_2] \times [Y_1, Y_2]$ then Equation 16 can be performed as two consequent one dimensional integrations. In this case the computational cost is $O(L_x+L_y)$ where $L_x$ is the number of pixels in the support of $w_x(x)$ and $L_y$ is the number of pixels in the support of $w_y(y)$. Moreover, if $w_x(x)$ and $w_y(y)$ are constant at each point of the corresponding support then the convolution in Equation 16 may be calculated using the result at the previous pixel, thus reducing the computational cost of the filtering. The computational cost of a bilateral filter in the form of Equation 16 in this case may be substantially O(1).

According to some embodiments of the invention, a two dimensional spatial factor of the filter function $w(\vec{r})$ may be separable, i.e.:

$$w_s(\vec{r}) = w_x(x) \cdot w_y(y) \quad \text{(Equation 18)}$$

where $w_x(x)$ and $w_y(y)$ have the form presented in Equations 5 and 6.

An example for a filter that conforms to Equation 17 may be $w(\vec{r}, \vec{r}') = w_s(\vec{r}, \vec{r}')$, where $w_s$ is a separable filter in the form:

$$w_s(x,y) = \begin{cases} \left(w_{s0} - 2 \cdot \cosh\left(\frac{x}{\sigma_s}\right)\right) \cdot \left(w_{s0} - 2 \cdot \cosh\left(\frac{y}{\sigma_s}\right)\right) \\ x \in [-N_F, N_F], \quad y \in [-M_F, M_F] \\ 0, \quad \text{otherwise} \end{cases} \quad \text{(Equation 19)}$$

where $2 \cdot M_F$ and $2 \cdot N_F$ are window support sizes.

According to some embodiments of the invention a bilateral filter in the general form presented in Equations 5 and 6 may be extended to two or more dimensions to form a multi-sub-component surrounding function. Multi-sub-component surrounding functions may be used for both spatial and photometric filtering.

According to some embodiments of the invention, a bilateral filter may be extended to color images and images of higher dimensions. The photometric component of a multi-sub-components filter, the spatial component of a multi-sub-components filter or both, may take the form:

$$w(t_1, t_2, \ldots, t_k) = w_1(t_1) \cdot w_2(t_2) \cdot \ldots \cdot w_k(t_k) \quad \text{(Equation 20)}$$

where each sub-component $w_1(t_1), w_2(t_2) \ldots w_k(t_k)$ conforms to Equations 5 and 6. The same principles demonstrated in the two dimensional case may apply here.

As example for a multi-sub-component bilateral filter that conforms to Equation 5, 6 and 19 may be a bilateral filter with a photometric component or a spatial component with kernel in the form:

$$f(t_1, t_2, \ldots, t_k) = (1+\cos t_1)^{n_1} \cdot (1+\cos t_2)^{n_2} \cdot \ldots \cdot (1+\cos t_k)^{n_k} \quad \text{(Equation 21)}$$

where $n_1$-$n_K$ are natural numbers. The form of each sub-component of the bilateral filter of equation 20 conforms to Equations 5 and 6 as shown with reference to Equations 8, 9 and 10. This filter can be applied to images having more than a single color, such as RGB images. When used for RGB images the filter of Equation 20 may have three sub-components such that every sub-component of the filter kernel may relate to one color data of RGB image for example:

$$f(t_r, t_g, t_b) = (1+\cos t_r)^{n_r} \cdot (1+\cos t_g)^{n_g} \cdot (1+\cos t_b)^{n_b} \quad \text{(Equation 22)}$$

where $t_r$ is the red sub-component, $t_g$ is the green sub-component and $t_b$ is the blue sub-component. This method may emphasize edges and smooth noisy RGB images.

According to some embodiments of the invention multi-sub-components bilateral filter conforming to Equation 20 may also take into account local gradients. For example, multi-sub-components bilateral filter conforming to Equation 20 may be used for gray-level digital images, where the first sub-component in the kernel of the filter depends on the image intensity values $Y(\vec{r})$ and the second and the third sub-components depend on image partial derivatives over x-coordinate and y-coordinate, respectively. According to some embodiments of the invention, the local gradient $w_g(\nabla Y(\vec{r}), \nabla Y(\vec{r}'))$ may be represented as a product of two sub-components such that each of them relates to a partial derivative at one direction, for example:

$$w_g(\nabla Y(\vec{r}), \nabla Y(\vec{r}')) = w_{gx}(Y'_x(\vec{r}) - Y'_x(\vec{r}')) \cdot w_{gy}(Y'_y(\vec{r}) - Y'_y(\vec{r}')) \quad \text{(Equation 23)}$$

Where $w_{gx}$ and $w_{gy}$ have the form presented in Equations 5 and 6. When applied on noisy gray image, this filter may yield a de-noised smooth image with preserved clear edges.

While embodiments of the present invention were described with relation to 2D images, it may be clear to those skilled in the art that the present invention can be extended easily to the higher dimensional images, for example 3D images, using the same principles described here above.

Figure 3A:
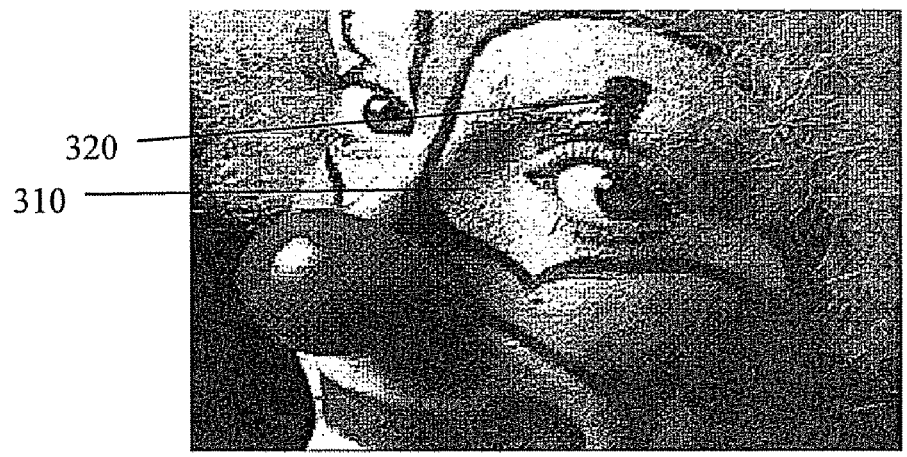
FIGS. 3A and 3B are a "before and after" example pictures demonstrating the changes in an outcome pictures of a bilateral filter versus an input picture according to embodiments of the current invention.
Figure 3B:

FIGS. 3A and 3B are "before and after" example pictures demonstrating the changes in an outcome pictures of a bilateral filter versus an input picture according to embodiments of the current invention. FIG. 3A is the picture before filtering and FIG. 3B is the picture after filtering. It can be seen that too fine details (for the purpose of the image processing of the present invention), which may represent the effect of noise in a picture, disappeared from the filtered image while sharp edges were preserved. For example while many details 310 on the skin of the clown disappeared in the filtered image 330, the edges of the black mark 320 on the skin are clearly seen on the filtered image 340. While other, known in the art, filters may achieve substantially similar outcomes, filtering according to embodiments of the invention requires significantly less computational power.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A bilateral filtering system, the system comprising:
an imaging device to take at least one input image, said input image is in the form of digital data indexed to represent the intensity $Y(\vec{r})$ at a particular position $\vec{r} = (x_1, \ldots, x_m)$ ($m \geq 1$) in said image;
a processor to calculate a corresponding second image $X(\vec{r})$ using a bilateral filter of the form:

$$X(\vec{r}) = \frac{1}{v(\vec{r})} \sum_{\vec{r}'} w(\vec{r}, \vec{r}') \cdot Y(\vec{r}') \quad \text{(Equation 1)}$$

$$v(\vec{r}) = \sum_{\vec{r}'} w(\vec{r}, \vec{r}')$$

where $$w(\vec{r}, \vec{r}') = w_s(\vec{r} - \vec{r}') \cdot w_{ph}(Y(\vec{r}) - Y(\vec{r}')) \quad \text{(Equation 2)}$$

$w_s$ is a spatial component, $w_{ph}$ is a photometric component, and at least one of said components is in the form:

$$w(t) = w_0 + \sum_{k=1}^{n} s_k \cdot w_k(t) \quad \text{(Equation 5)}$$

$$w_k(t) = a_k^t \quad \text{(Equation 6)}$$

where $a_k$ (k=1 ... n), $w_0$ and $s_k$ (k=1 ... n) are constants and t belongs to a window interval $I = [-N_1, N_2]$,
and to transmit said second image to a display; and
a display unit to present said second image $X(\vec{r})$.

2. The system of claim 1, wherein at least one of said components take one form selectable from a list comprising:

$$w(t) = f_n(t) = (1 + \cos \sigma t)^n \quad \text{(Equation 8)}$$

and $$w(t) = w_0 - \cos h(t/\sigma) \quad \text{(Equation 11)}$$

where n is a natural number and σ may be a real number.

3. The system of claim 1, wherein said processor to calculate said corresponding second image $X(\vec{r})$ according to $$X(\vec{r}) = \frac{1}{v(\vec{r})} e^{-\sigma \cdot Y(\vec{r})} \cdot \sum_{\vec{r}'} e^{\sigma \cdot Y(\vec{r}')} \cdot Y(\vec{r}') \cdot w_s(\vec{r} - \vec{r}'). \quad \text{(Equation 16)}$$

where $w_s$ is a kernel of a spatial filter, σ is a real constant and $$v(\vec{r}) = \sum_{\vec{r}'} e^{\sigma \cdot (Y(\vec{r}) - Y(\vec{r}'))} \cdot w_s(\vec{r} - \vec{r}') \quad \text{(Equation 15)}$$

4. The system of claim 1, wherein said special component of said filter function $w(\vec{r})$ is separable such that $$w(\vec{r}) = w_x(x) \cdot w_y(y) \quad \text{(Equation 17)}$$

5. The system of claim 4, wherein said filter function $w(\vec{r})$ is in the form:

$$w_s(x, y) = \begin{cases} \left(w_{s0} - 2 \cdot \cosh\left(\frac{x}{\sigma_s}\right)\right) \cdot \left(w_{s0} - 2 \cdot \cosh\left(\frac{y}{\sigma_s}\right)\right) \\ \quad x \in [-N_F, N_F], \quad y \in [-M_F, M_F] \\ 0, \quad \text{otherwise} \end{cases} \quad \text{(Equation 18)}$$

where $2 \cdot M_F$ and $2 \cdot N_F$ are window support sizes.

6. The system of claim 1, wherein at least one of said photometric and spatial components is in the form:

$$w(t_1,t_2,\ldots,t_k)=w_1(t_1)\cdot w_2(t_2)\cdot\ldots\cdot w_k(t_k) \quad \text{(Equation 24)}$$

where each sub-component $w_1(t_1), w_2(t_2) \ldots w_k(t_k)$ conforms to said Equations 5 and 6.

7. The system of claim 6, wherein at least one of said photometric and spatial components is in the form:

$$f(t_1,t_2,\ldots,t_k)=(1+\cos t_1)^{n_1}\cdot(1+\cos t_2)^{n_1}\cdot\ldots\cdot(1+\cos t_k)^{n_k} \quad \text{(Equation 20)}$$

where $n_1$-$n_K$ are natural numbers.

8. The system of claim 6, wherein three of said sub-components relate, each to one color data of a RGB image.

9. The system of claim 8, wherein at least one of said photometric and spatial components is in the form:

$$f(t_r,t_g,t_b)=(1+\cos t_r)^{n_r}\cdot(1+\cos t_g)^{n_g}\cdot(1+\cos t_b)^{n_b} \quad \text{(Equation 21)}$$

where $t_r$ is the red component, $t_g$ is the green component and $t_b$ is the blue component.

10. The system of claim 6, wherein at least one of said sub-components depends on local gradients.

11. The system of claim 10, wherein at least one of said sub-components depends on a partial derivative at one direction.

12. The system of claim 11, wherein said photometric component is in the form:

$$w_g(\nabla Y(\vec{r}),\nabla Y(\vec{r}'))=w_{gx}(Y'_x(\vec{r})-Y'_x(\vec{r}'))\cdot w_{gy}(Y'_y(\vec{r})-Y'_y(\vec{r}')) \quad \text{(Equation 22)}$$

13. A method for image processing, the method comprising:

taking at least one input image, said input image is in the form of digital data indexed to represent the intensity $Y(\vec{r})$ at a particular position $\vec{r}=(x_1,\ldots,x_m)$ ($m \geq 1$) in said image;

calculating a corresponding second image $X(\vec{r})$ using a bilateral filter of the form:

$$X(\vec{r}) = \frac{1}{v(\vec{r})}\sum_{\vec{r}'} w(\vec{r},\vec{r}')\cdot Y(\vec{r}') \quad \text{(Equation 1)}$$

$$v(\vec{r}) = \sum_{\vec{r}'} w(\vec{r},\vec{r}')$$

where, $$w(\vec{r},\vec{r}') = w_s(\vec{r}-\vec{r}')\cdot w_{ph}(Y(\vec{r})-Y(\vec{r}')) \quad \text{(Equation 2)}$$

$w_s$ is a spatial component, $w_{ph}$ is a photometric component, and at least one of said components is in the form:

$$w(t) = w_0 + \sum_{k=1}^{n} s_k\cdot w_k(t) \quad \text{(Equation 5)}$$

$$w_k(t) = a_k^t \quad \text{(Equation 6)}$$

where $a_k$ (k=1 ... n), $w_0$ and $s_k$ (k=1 ... n) are constants and t belongs to a window interval $I=[-N_1,N_2]$; and displaying said second image $X(\vec{r})$.

14. The method of claim 13, wherein at least one of said components takes one form selectable from a list comprising:

$$w(t)=f_n(t)=(1+\cos \sigma t)^n \quad \text{(Equation 8)}$$

and $$w(t)=w_0-\cos h(t/\sigma) \quad \text{(Equation 11)}$$

where n is a natural number and σ may be a real number.

15. The method of claim 13, wherein said calculation of said corresponding second image $X(\vec{r})$ is performed according to $$X(\vec{r}) = \frac{1}{v(\vec{r})}e^{-\sigma\cdot Y(\vec{r})}\cdot \sum_{\vec{r}'} e^{\sigma\cdot Y(\vec{r}')}\cdot Y(\vec{r}')\cdot w_s(\vec{r}-\vec{r}') \quad \text{(Equation 16)}$$

where $w_s$ is a kernel of a spatial filter, σ is a real constant and $$v(\vec{r}) = \sum_{\vec{r}'} e^{\sigma\cdot(Y(\vec{r})-Y(\vec{r}'))}\cdot w_s(\vec{r}-\vec{r}') \quad \text{(Equation 15)}$$

16. The method of claim 13, wherein said special component of said filter function $w(\vec{r})$ is separable such that $$w(\vec{r})=w_x(x)\cdot w_y(y) \quad \text{(Equation 17)}$$

17. The method of claim 16, wherein filter function $w(\vec{r})$ is in the form:

$$w_s(x,y) = \begin{cases} \left(w_{s0}-2\cdot\cos h\left(\frac{x}{\sigma_s}\right)\right)\cdot\left(w_{s0}-2\cdot\cos h\left(\frac{y}{\sigma_s}\right)\right) \\ \quad x \in [-N_F, N_F], \quad y \in [-M_F, M_F] \\ 0, \quad \text{otherwise} \end{cases} \quad \text{(Equation 18)}$$

Where $2\cdot M_F$ and $2\cdot N_F$ are window support sizes.

18. The method of claim 13, wherein at least one of said photometric and spatial components is in the form:

$$w(t_1,t_2,\ldots,t_k)=w_1(t_1)\cdot w_2(t_2)\cdot\ldots\cdot w_k(t_k) \quad \text{(Equation 25)}$$

where each sub-component $w_1(t_1), w_2(t_2) \ldots w_k(t_k)$ conforms to said Equations 5 and 6.

19. The method of claim 18, wherein at least one of said photometric and spatial components is in the form:

$$f(t_1,t_2,\ldots,t_k)=(1+\cos t_1)^{n_1}\cdot(1+\cos t_2)^{n_1}\cdot\ldots\cdot(1+\cos t_k)^{n_k} \quad \text{(Equation 20)}$$

where $n_1$-$n_K$ are natural numbers.

20. The method of claim 18, wherein three of said sub-components relate, each to one color data of a RGB image.

21. The method of claim 20, wherein at least one of said photometric and spatial components is in the form:

$$f(t_r,t_g,t_b)=(1+\cos t_r)^{n_r}\cdot(1+\cos t_g)^{n_g}\cdot(1+\cos t_b)^{n_b} \quad \text{(Equation 21)}$$

where $t_r$ is the red component, $t_g$ is the green component and $t_b$ is the blue component.

22. The method of claim 18, wherein at least one of said sub-components depends on local gradients.

23. The method of claim 22, wherein at least one of said sub-components depends on a partial derivative at one direction.

24. The method of claim 23, wherein said photometric component is in the form:

$$w_g(\nabla Y(\vec{r}),\nabla Y(\vec{r}'))=w_{gx}(Y'_x(\vec{r})-Y'_x(\vec{r}'))\cdot w_{gy}(Y'_y(\vec{r})-Y'_y(\vec{r}')) \quad \text{(Equation 22)}$$

25. A non-transitory machine-readable medium having stored thereon instructions that, if executed by a machine, cause the machine to perform a method comprising:

receiving at least one input image, said input image is in the form of digital data indexed to represent the intensity $Y(\vec{r})$ at a particular position $\vec{r}=(x_1,\ldots,x_m)$ ($m\geq 1$) in said image;

calculating a corresponding second image $X(\vec{r})$ using a bilateral filter of the form:

$$X(\vec{r}) = \frac{1}{v(\vec{r})} \sum_{\vec{r}'} w(\vec{r},\vec{r}') \cdot Y(\vec{r}') \quad \text{(Equation 1)}$$

$$v(\vec{r}) = \sum_{\vec{r}'} w(\vec{r},\vec{r}')$$

where, $$w(\vec{r},\vec{r}') = w_s(\vec{r}-\vec{r}') \cdot w_{ph}(Y(\vec{r})-Y(\vec{r}')) \quad \text{(Equation 2)}$$

$w_s$ is a spatial component, $w_{ph}$ is a photometric component, and at least one of said photometric component is in the form:

$$w(t) = w_0 + \sum_{k=1}^{n} s_k \cdot w_k(t) \quad \text{(Equation 5)}$$

$$w_k(t) = a_k^t \quad \text{(Equation 6)}$$

where $a_k$ ($k=1\ldots n$), $w_0$ and $s_k$ ($k=1\ldots n$) are constants and t belongs to a window interval $I=[-N_1,N_2]$; and sending said second image $X(\vec{r})$ to a display unit for display.

\* \* \* \* \*